United States Patent [19]

Molnar et al.

[11] 4,147,133

[45] Apr. 3, 1979

[54] DISPENSER DEVICE FOR SMALL ANIMAL FOOD OR THE LIKE

[75] Inventors: John A. Molnar, Valley Cottage, N.Y.; James B. Stewart, Randolph Township, Morris County; Sheldon P. Schmidt, Paramus, both of N.J.

[73] Assignee: Mattel, Inc., Hawthorne, Calif.

[21] Appl. No.: 822,413

[22] Filed: Aug. 8, 1977

[51] Int. Cl.$^2$ .............................................. A01K 5/00
[52] U.S. Cl. ...................................... 119/55; 222/166
[58] Field of Search ................. 119/55, 54, 53.5, 52 R; 222/164, 166

[56] References Cited

U.S. PATENT DOCUMENTS

| 352,925 | 11/1886 | Mathews | 222/166 |
| 364,316 | 6/1887 | Stacy | 222/166 |
| 1,072,570 | 9/1913 | Callahan | 119/54 |
| 1,398,179 | 11/1921 | Dierks | 119/54 |
| 1,446,694 | 2/1923 | Dierks | 119/53.5 |
| 1,449,485 | 3/1923 | Alspach | 119/54 |
| 1,554,071 | 9/1925 | Downs | 222/196 |
| 1,569,990 | 1/1926 | Lovering | 119/54 |
| 2,181,661 | 11/1939 | Lowry | 221/146 |
| 2,570,640 | 10/1951 | Carmo | 119/54 |
| 3,847,305 | 11/1974 | Tobin | 222/166 |

FOREIGN PATENT DOCUMENTS 199441 6/1923 United Kingdom ................... 119/55

Primary Examiner—Hugh R. Chamblee
Attorney, Agent, or Firm—John G. Mesaros; Max E. Shirk; Ronald M. Goldman

[57] ABSTRACT

A dispenser for small animal food or the like, the dispenser including a base member having a planar surface and upwardly extending wall portion defining an elongate trough for tiltably receiving a plurality of unitary hopper members, each hopper member having a front wall, sidewalls, a back wall and a bottom with a pivot projection downwardly depending from the bottom, the pivot projection being generally coextensive or co-planar with the front wall. A depressor pedal member is generally co-planar with the bottom and is supported in generally parallel relation with the planar surface of the base with the hopper member supported within the trough. A cover is provided to completely enclose the plurality of hopper members, the cover having an aperture through which the depressor member extends, the cover aperture being in alignment with a hopper aperture formed in the front wall. Depression of the leading edge of the pedal member tilts the hopper about its pivot to permit food to pass down the incline so-formed. The base member is also provided with portions extending upwardly from the planar surface on either side of the depressor member to assist in guiding the food down the ramp or incline surface.

11 Claims, 4 Drawing Figures

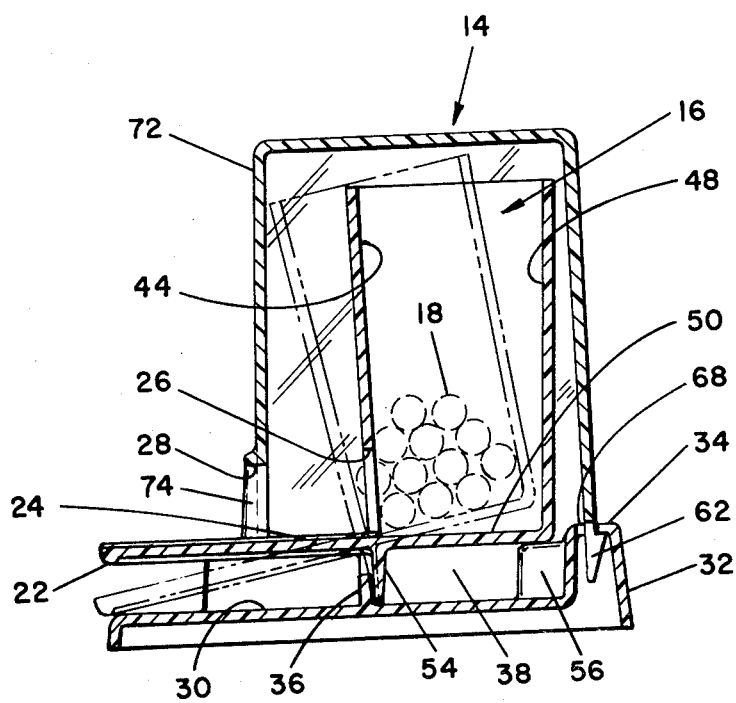

DISPENSER DEVICE FOR SMALL ANIMAL FOOD OR THE LIKE

BACKGROUND OF THE INVENTION

The background of the invention will be discussed in two parts:

1. Field of the Invention

This invention results to dispensers and more particularly to a dispenser device for dispensing small animal food or the like.

2. Description of the Prior Art

Dispensing mechanisms are well know in the prior art, such dispensing mechanisms ordinarily including springs, articulated linkages or rotatable devices pivoted on shafts or the like. Such devices are typified by the devices illustrated in the patents transmitted herewith to the Patent Office under separate cover letter, such patents including U.S. Pat. Nos. 352,925; 364,316; 516,339; 1,072,570; 1,449,485; 1,554,071; 1,569,990; 2,181,661; 2,570,640; and 3,847,305. The devices shown in these patents are utilized to dispense nails, animal feed, potatoes and nuts or candy.

Such prior art devices are unduly complicated in form and operation and not readily suitable for mass production.

Accordingly, it is an object of this invention to provide a new and improved dispenser device which is simple in construction and operation and capable of mass production.

It is another object of this invention to provide a new and improved dispenser device which can be used for dispensing food for small animals and is actuable by the small animal.

It is a further object of this invention to provide a new and improved dispensing device having very few parts.

It is an additional object to provide a dispensing device having means for settling the contents therein after actuation thereof.

SUMMARY OF THE INVENTION

The foregoing and other objects of the invention are accomplished by providing a dispenser device having a base member with a generally planar surface and upwardly extending wall portions defining an elongate trough adapted to receive a plurality of hopper members. Each hopper member is identically configured and includes a front wall, sidewalls, a back wall and a bottom with the fron wall having an aperture therein communicating with the bottom thereof. A pivot projection extends downwardly from the bottom in generally coplanar relation with the front wall of the hopper member. A depressor plate or pedal member is generally co-planar with the bottom of the hopper member and terminates in an enlarged tab end actuable by the foot of the small animal. Each of the hopper members is positioned within the elongate trough with the end of the pivot projection resting in the planar surface within the trough, the trough being configured to support the weight of the hopper with the plane of the bottom and depressor member generally parallel or at an angle to the planar surface, the angular spacing inclining the depressor member tab end upwardly slightly. A generally box-shaped open bottom cover member is provided with a plurality of dart type snap tabs insertible into aligned apertures within the wall portion of the base for releasably securing the cover to the base, the cover being configured to completely enclose the hopper members therein and of sufficient dimension to allow tilting of the hopper members during actuation thereof.

The cover is provided with a plurality of cutouts having a width slightly greater than the width of the main portion of the depressor member to provide apertures in alignment with the apertures formed in the hopper member. The base is provided with upwardly extending intermediate wall portions formed on either side of the depressor members to enable the sidewalls on either side of the depressor member to act as guide means for the dispensed item when the depressor member is pivoted toward the planar surface to thereby tilt the hopper member to dispense the items therein through the hopper aperture and the cover cutout.

Other objects, features and advantages of the invention will become apparent upon a reading of the specification when taken in conjunction with the drawings in which like reference numerals refer to like elements in the several views.

DESCRIPTION OF THE PREFERRED EMBODIMENT

Figure 1:
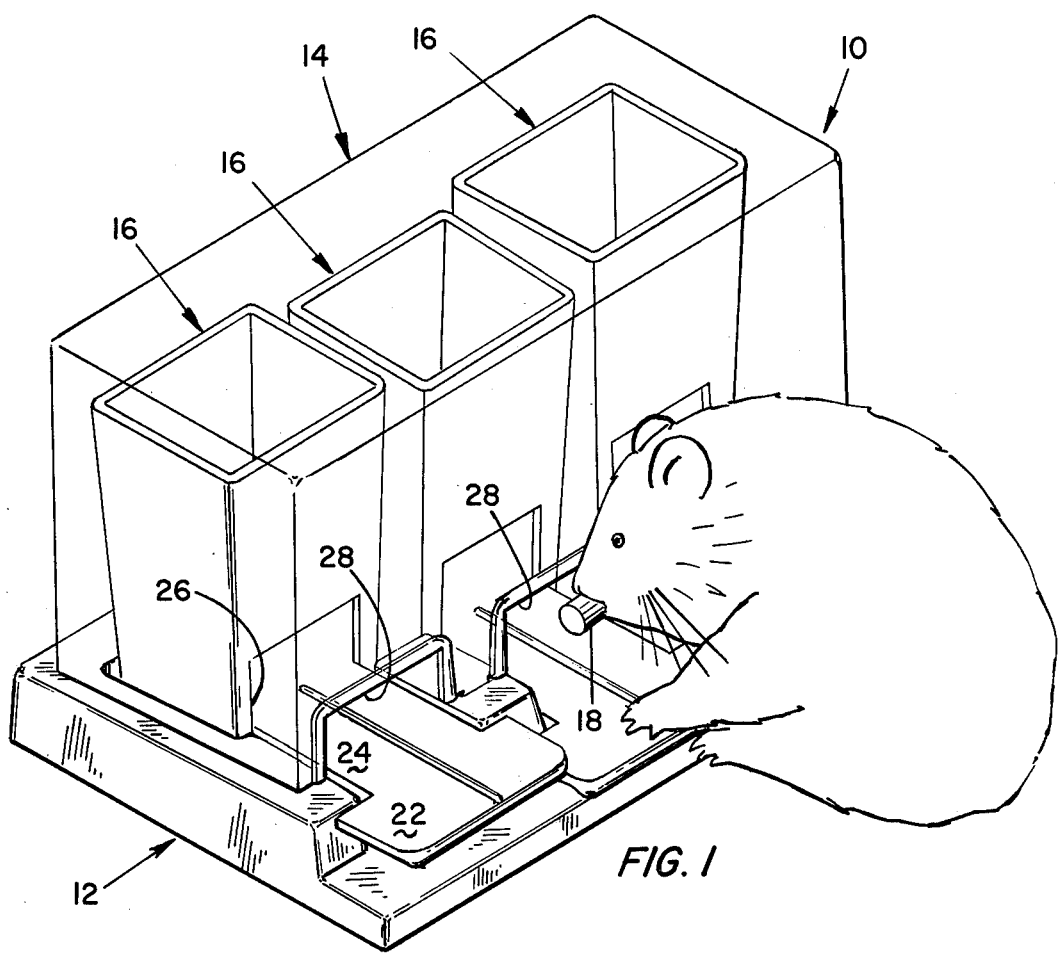
FIG. 1 is a perspective view of the dispensing device according to the invention with the cover thereof being illustrated as a transparent cover.

Referring now to the drawings, and particularly to FIG. 1, there is shown a dispensing device generally designated 10 which includes a base member generally designated 12, a cover generally designated 14 and a plurality of hopper members generally designated 16. Each of the hopper members 16 is identical and in the device 10 illustrated, three hoppers are shown for dispensing small animal food 18 to a small animal such as a hamster 20 or the like. As will hereinafter be described, each of the hopper members 16 is tiltably supported by the base member 12, the hopper member 16 having an enlarged tab end 22 of a depressor member 24 which is actuable by the hamster 20 to tilt the hopper member 16 to allow the food 18 to pass out through a first aperture 26 formed in the hopper member 16 and through a second aperture formed by cutouts 28 in alignment with the aperture 26 to pass down the inclined plane formed by the tilted depressor member 24.

Figure 3:
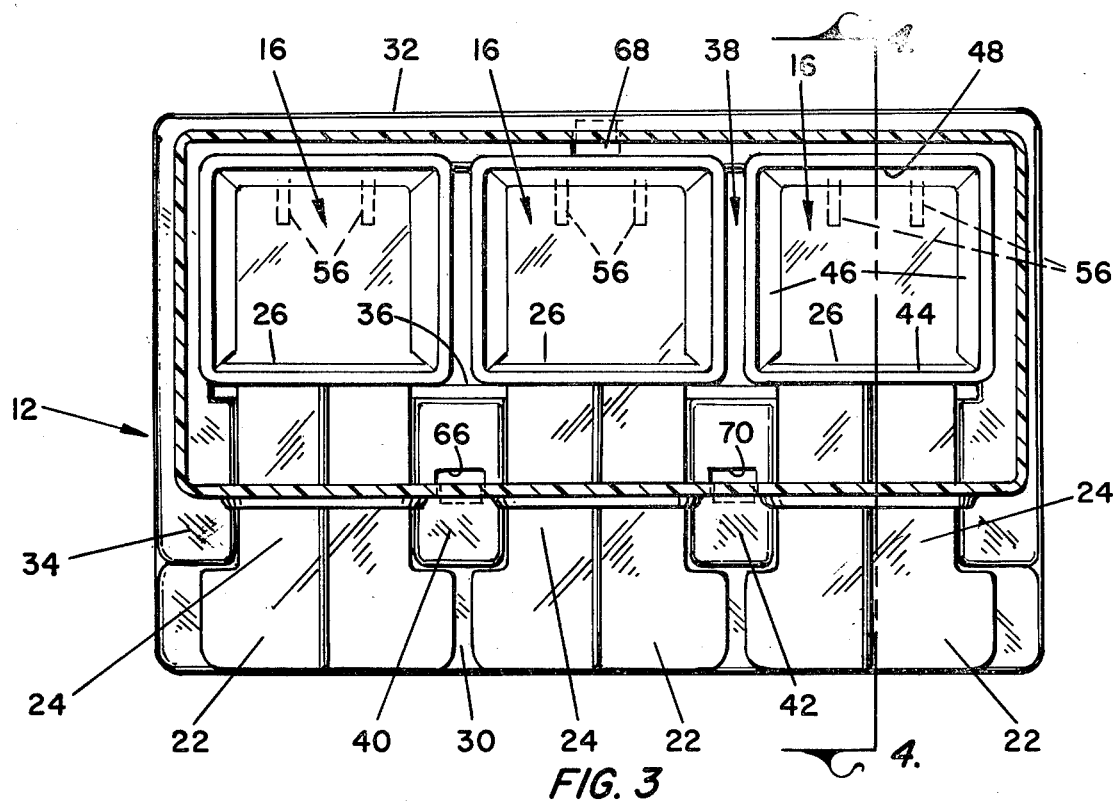
FIG. 3 is a plan view of the device of FIG. 1 partially in cross section taken along line 3—3 of FIG. 2.
Figure 4:
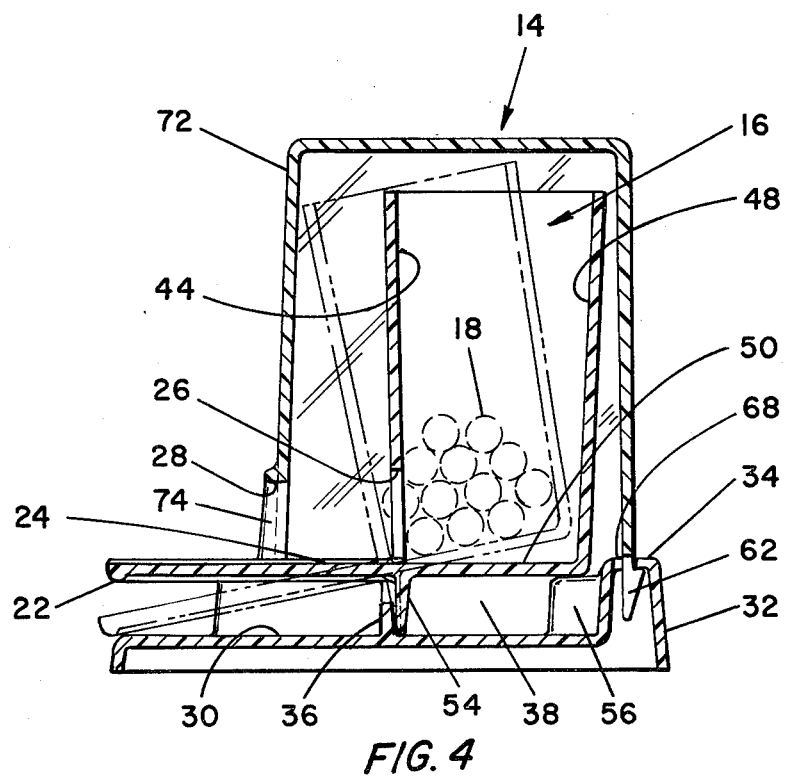
FIG. 4 is a cross-sectional end view of the device taken along line 4—4 of FIG. 3.

As best illustrated in FIGS. 3 and 4, the base member 12 is generally rectangular in plan view and has a planar surface 30 with upwardly extending wall portions formed integral therewith. As can be seen in FIG. 3, a first wall portion 32 is generally C-shaped in plan and extends rearwardly a substantial portion of each of the sides of the base member 12 and completely along the back periphery of the base member 12. The wall portions 32 have a relatively broad upper edge 34 with the edge 34 being generally parallel to the planar surface 30 and spaced a given distance therefrom. Extending parallel to the bight portion of the wall portion 32 and spaced from the free ends of the opposite arms of wall portion 32 is an interconnecting web or wall portion 36 which defines an elongate trough generally designated 38 for receiving and retaining the hopper members 16. Extending generally perpendicular to the web or wall portion 36 are intermediate wall portions 40 and 42 which ar parallel to each other and parallel to the free ends of the arms of wall portion 34 and in spaced relation to define three pathways for receiving the depressor members 24. As can be seen in FIG. 3, the sidewalls of wall portions 34, 40 and 42 extend generally perpendicular to the plane of planar surface 30 with opposing sidewalls being generally parallel and with the outer edges of depressor member 24 therebetween in close proximity to the sidewalls. Similarly, the enlarged tab end 22 of each hopper member 16 is configured to extend around the corner of the adjacent wall portions with the free edge on the enlarged tab end 22 being generally coextensive with the edge of planar surface 30 of base member 12.

Each of the hoppers 16 has a generally open top with a front wall 44, sidewalls 46, a back wall 48 and a bottom 50 with a depressor member 24 being generally co-planar with the bottom 50. The front wall 44 has an aperture 26 formed in the bottom thereof to permit food pellets 18 to pass therethrough when the hopper 16 is tilted.

As illustrated in FIGS. 1–4, the walls 44, 46 and 48 are tapered downwardly to provide a larger opening at the top to facilitate insertion of food into the hopper member 16 and to correspondingly provide a smaller aperture 26 for passage therethrough of the dispensed items such as food pellets 18.

Extending downwardly from the undersurfce of bottom 50 is a pivot edge or projection 54 which has the same width as the bottom 50 and lies in a plane generally coextensive with the front wall 44 of hopper member 16. The overall depth of pivot projection 54 is such as to permit the lower edge thereof to rest on the planar surface 30 adjacent wall portion 36 within trough 38. As best illustrated in FIG. 4, the trough 38 is so dimensioned with reference to the dimension of the bottom 50 that with the pivot projection 54 in place the rear portion of the bottom 50 rests on integrally formed upwardly extending web shoulder portions 56 formed within trough 38 with the plane of the bottom 50 generally parallel to the planar surface 30 or tilted slightly clockwise with reference to planar surface 30. As illustrated in FIG. 3, two web shoulder portions 56 coact with the bottom 50 of each of the hopper members 16 to support the hopper 16 in the desired position with or without a load of items or food pellets 18 therein. The overall size and weight of each of the hopper members 16 is such that, as viewed in FIG. 4, the center of gravity of each hopper member 16 is to the right or rearwardly of the fulcrum or pivot projection 54.

Figure 2:
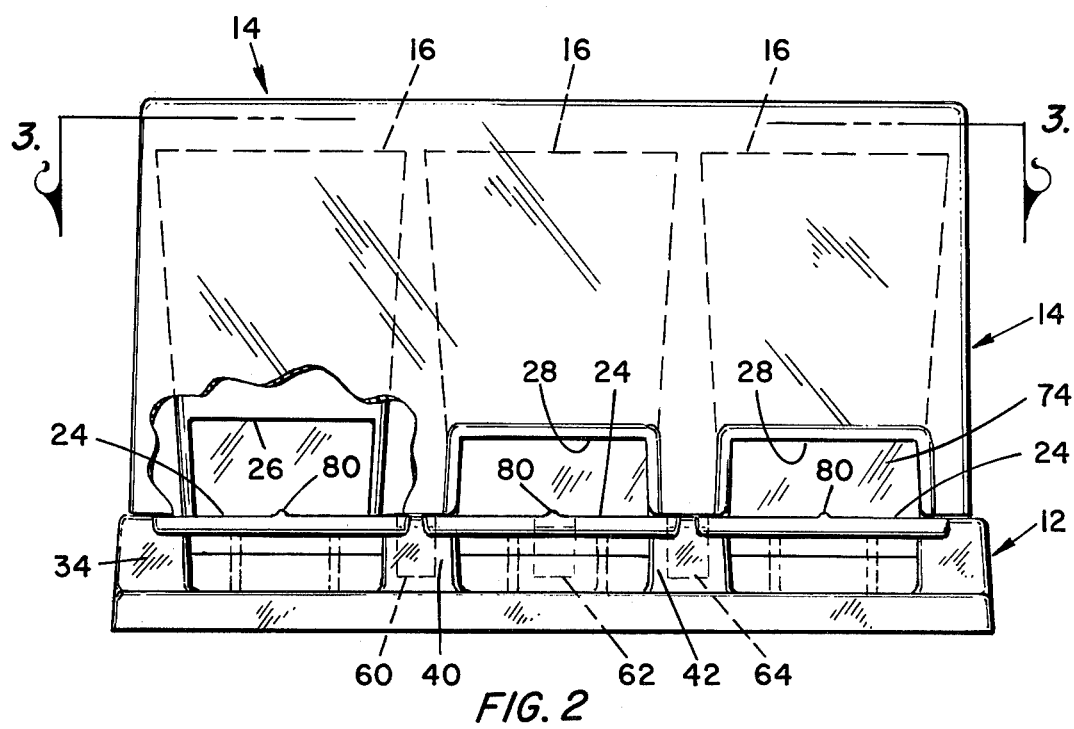
FIG. 2 is a front view of the dispensing device of FIG. 1.

Enclosing the hopper member 16 is a housing or cover member 14 which is a generally inverted box-shaped enclosure having an open bottom with a plurality of downwardly extending dart type snap tabs 60, 62 and 64 engagable within aligned apertures 66, 68 and 70, respectively, formed in wall portion 40, wall portion 32 and wall portion 42, respectively, (see FIGS. 2 and 3). The snap tab 62 is formed integrally with the rear wall and generally centrally thereof with the snap tabs 60 and 64 being formed in the front wall in spaced relation corresponding to the positions of intermediate wall portions 40 and 42. The front wall 72 of cover 14 is provided with a plurality of cutouts 28 which, in conjunction with intermediate wall portions 40 and 42 and the aligned spaced sections of wall portions 34 define apertures 74 in general aignment with apertures 26 of hopper member 16.

The inner configuration and dimensions of cover member 14 are sufficient to enable the hopper member 16 to be tilted to the dotted line position shown in FIG. 4 without interference as will now be described with reference to the operation of the device. To load the hoppers 16 with items such as small animal food the cover member 14 is removed by engaging the back wall and front wall 72 and urging them toward each other until the snap tabs 60, 62 and 64 suitably clear the engaged aperture 66, 68 and 70, respectively, and base member 12. With the cover member 14 removed, the hoppers 16 can then be loaded. Small animal food for hamsters or the like may be in the form of pellets configured like aspirin or in elongated cylindrical form. In either event, the items are loaded into each of the hoppers with each of the hoppers being capable of retaining the same or different type items as desired. The cover is then reinserted into position and the so loaded dispenser 10 is placed in the small animal housing or cage. When the hoppers 16 are loaded, the weight of each bin assists in maintaining the hopper 16 in the solid line position shown in FIG. 4. As the small animal 20 depresses the enlarged tab end 22 of the depressor member 24 the hopper member 16 is tilted about its pivot projection 44 to the dotted line position shown in FIG. 4 to incline the depressor member 24 along with the bottom 50 to form a ramp or incline plane to permit the food pellets 18 to pass through the aperture 26 down the ramp so formed through the aperture 74 formed by cutouts 28 to feed the animal 20.

To assist in the orderly dispensing of the items or food pellets 18, as can be seen in FIG. 2 the configuration of various parts are such that the plane of the depressor member 24 is coextensive with or slightly above the plane defined by the upper edges of the wall portions 34, 40 and 42. As the hopper members 16 are tilted by depression of the enlarged tab end 22 of the depressor member 24, the sidewalls of the wall portions on either side of the depressor member 24 being in spaced proximate relation to the edges thereof serve as guiding means or guidewalls to direct the flow of food pellets 18 down the ramp and, in effect, forming a chute. To further assist on the passage of larger items of food pellets 18, which may be in cylindrical form, centrally disposed and integrally formed with each depressor member 24 a central rib 80 extends generally perpendicular to the plane of the opening 26 of hopper member 16. In addition, by reference to the central hopper 16 shown in FIG. 3, the sidewalls of intermediate wall portions 40 and 42 on either side of depressor member 24 have a length extending into close proximity to the aperture 26 thereof to assist in directing pellets as soon as they leave the aperture. The rib 80 terminates adjacent the opening 26 to provide an edge which assists in keeping the food items 18 within the hopper member 16 when in its non-tilted position. Food items 18 must first pass over this edge or protuberance to commence passage down the chute when the hopper member 16 is in its tilted position. With small animals such as hamsters or the like, during this tilting action, the food items 18 settle within the hopper member 16 due to the sudden return action of the hopper 16. As a consequence this "vibrating" type action is constantly providing pellets of food items 18 adjacent aperture 26 for subsequent discharge.

Consequently, there has been shown and described a dispensing device for dispensing small animal food or the like, the device being compact in size, efficient in the arrangements of parts, uncomplicated in not requiring shafts, springs, linkages or the like with the primary operating mechanism being in the form of a "seesaw" platform tilting about a fulcrum or pivot projection 54. Although the pivot projection 54 has been shown and described as beng integral with the bottom of hopper 16, alternatively the pivot projection can be integral with the base member 12 within the trough portion 38 formating engagement with a detent or groove formed in the bottom of hopper member 16. While there has been shown and described a preferred embodiment it is to be understood that various other adaptations and modifications may be made within the spirit and scope of the invention.

What is claimed is:

1. In a dispenser for small animal food items or the like, the combination comprising:
    a base member having a generally planar surface and wall means formed in said planar surface to define a trough;
    at least one hopper member having a front wall, two sidewalls, a back wall and a bottom, said front wall having an opening therein adjacent said bottom;
    a depressor member formed integral with said hopper member and having a surface generally co-planar with said bottom;
    pivot means engaging said planar surface within said trough for tiltably supporting said hopper member on said base member, said hopper member being tilted by actuation of said depressor member to permit said items to pass down the thus-inclined depressor member through said opening in said hopper member; and
    cover means releasably secured to said base member for enclosing said at least one hopper member, said cover means having cutout means in alignment with said depressor member and in alignment with said opening for passage of said food items therethrough.

2. The combination according to claim 1 wherein said pivot means includes a pivot projection formed integrally with the bottom of said hopper member in depending relation to the bottom thereof.

3. The combination according to claim 2 wherein said trough includes shoulder means for engaging the bottom of said hopper member, said pivot projection and said shoulder means maintaining said depressor member in general parallel alignment with said planar surfce.

4. The combination according to claim 3 including other wall means formed integrally with said planar surface for coacting with opposite edges of said depressor member to form a guide chute for guiding items down said depressor member when said hopper is tilted by pressure on said depressor member.

5. The combination according to claim 4 wherein said depressor member has an enlarged tab end.

6. The combination according to claim 5 wherein said surface of said depressor member has rib means thereon extending in the direction of travel of said items for assisting in guiding said food items.

7. The combination according to claim 6 wherein said rib means terminate adjacent said opening to at least partially assist in retaining said items within said hopper member in its normal position.

8. The combination according to claim 7 wherein said rib means is a centrally disposed rib extending the length of said depressor member.

9. The combination according to claim 8 wherein said cover means is an inverted box-like cover with snap tab means and said base member includes apertures engageable by said snap tab means.

10. The combination according to claim 9 wherein said trough is an elongate trough and said dispenser includes three hopper member tiltably supported within said elongate trough.

11. The combination according to claim 10 wherein said pivot projection is a pivot bar member generally co-planar with said front wall of said hopper member.

* * * * *